June 13, 1961  J. BÖTTGER  2,988,067
ARRANGEMENT OF FUEL JETS WITHIN AN OPEN COMBUSTION
SPACE OF A COMPRESSION IGNITION ENGINE
Filed May 6, 1958  2 Sheets-Sheet 1

INVENTOR.
JOSEF BÖTTGER

BY

AGENT

INVENTOR.
JOSEF BÖTTGER

BY

AGENT

United States Patent Office 2,988,067
Patented June 13, 1961

2,988,067
ARRANGEMENT OF FUEL JETS WITHIN AN OPEN COMBUSTION SPACE OF A COMPRESSION IGNITION ENGINE
Josef Böttger, No. 5 V Mezihori, Prague, Czechoslovakia
Filed May 6, 1958, Ser. No. 733,388
Claims priority, application Czechoslovakia June 12, 1957
10 Claims. (Cl. 123—32)

The present invention relates to an arrangement of fuel jets within an open combustion chamber or space of a compression ignition engine, which space contains nearly the entire or the entire air of combustion when the piston is at top dead center and in which the air is imparted a rotary movement around the axis of the combustion space, which is usually identical with the cylinder or piston axis. The fuel jets discharged from an eccentrically located injection nozzle are arranged so that of a plurality of fuel jets one jet reaches the combustion chamber wall at the hottest point thereof earlier than the remaining ones. The invention applies this principle to flat open combustion spaces formed either within the cylinder head or the piston, or to combustion spaces between the cylinder head and the piston top.

Such an arrangement permits controlled ignition and noiseless combustion and is particularly useful in connection with combustion chambers which are spherical, which have the shape of an ellipsoid of revolution joined to the frustum of a cone, or which are toroidally shaped. The combustion chambers may be connected with the cylinder space by a cylindrical or conical passage. It is common to arrange combustion spaces of this kind in four-stroke engines within the piston. The combustion space communicates with the cylinder space above the piston by way of passages formed so that the air rotating above the piston at high velocity may enter the combustion chamber along the wall of same. Such an arrangement is practically limited to high speed engines of small or medium piston displacement. With such engines, particularly in the case of low bore/stroke ratios, an increase in the rotational energy of the air within the cylinder is achieved by sacrificing volumetric efficiency. Nevertheless by suitable design of the intake valves and of the intake passages air flow can be speeded up and directed so that the ratio of total air intake to fuel consumed, when expressed in terms of chemical equivalents for the combustion reaction, remains as low as possible and approaches the ratio 1:1, that is, the value for a stoichiometric mixture.

If the requirements for substantially laminar rotational air movement within the cylinder are met, even flat, entirely open combustion chambers e.g. of the Hesselmann, of the cylindrical disk or lens-shaped type can be used with two valves and the arrangement of fuel jets according to the present invention. By injecting one of a plurality of fuel jets almost radially and in the shortest path against the hottest point of the piston top or cylinder head and the remaining jets in the direction of air rotation into free space, i.e. with greater free jet lengths, a much better utilization of the available air is attained by controlled mixture ignition of a small charge ignited at the hottest point of the piston (or cylinder head) before the remaining fuel is ignited. Such a controlled initial iginition of a small fuel charge at the hottest point of the combustion chamber ensures silent burning without knocking of the entire injected fuel charge. In this manner, it is possible to overcome the low efficiency of air utilization, found particularly in conventional compression ignition engines of medium and large displacement, the smoke limit of which until now was much lower than that of the high-speed engines employed in automotive vehicles.

Particularly in diesel-electric engines, the basic advantages of the present invention, viz. better air utilization and noiseless combustion, considerably reduce fuel consumption and permit noiseless ("soft") engine operation.

In the device of the invention a plurality of fuel jets may be replaced by a single fan-shaped jet disposed so that one marginal portion is aimed towards the centre of the piston top or of the opposite portion of the cylinder head, and the diametrically opposite marginal portion of the jet is aimed towards the side wall of the combustion chamber or even towards the edge of the cylinder head in the combustion space or towards the edge of the piston top.

Other objects, features, and advantages of the invention will hereinafter become more fully apparent from the following description of the annexed drawings, which illustrate preferred embodiments, and wherein.

Figure 1:
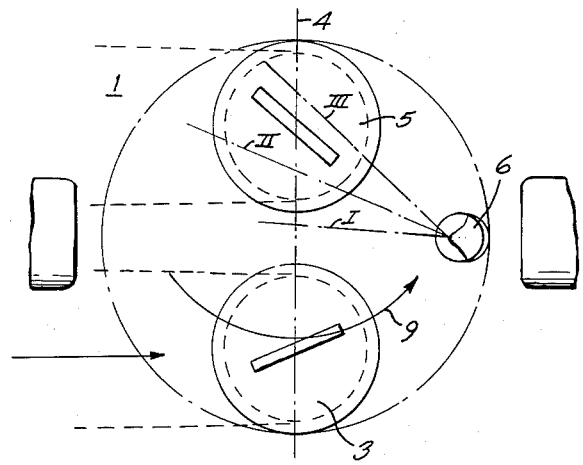
FIG. 1 is a fragmentary plan view of a cylinder according to the invention.
Figure 2:
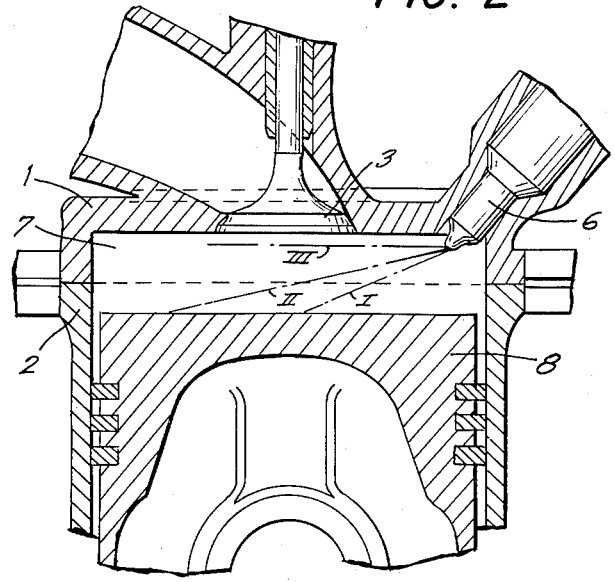
FIG. 2 shows a fragmentary axial section of the cylinder of FIG. 1.

FIG. 1 shows a plan view of the internal transverse head face 1 of the cylinder 2. FIG. 2 is an axially sectional view of the cylinder 2 and associated members. An inlet valve 3, when opened, admits air tangentially into a cylinder 2, i.e. transversely to the longitudinal axis 4 of the cylinder. The exhaust valve 5 is arranged in the same axial plane as valve 3 whereby the greatest selection of valve diameters is possible. This ensure maximum filling of the cylinder with air and scavenging of combustion products. The injection valve 6 is located at the outer edge of the head face 1 of cylinder 2 and injects fuel in several jets into the combustion chamber 7 which is disk-shaped. There are shown three jets I, II, III, in such an arrangement that the jet I aims towards the center portion of the top of piston 8 while the remaining jets II and III of greater free lengths are directed substantially in the direction of rotation of the air as indicated by the arrow 9, in part against the top of piston 8 and in part against an axial wall of the disk-shaped combustion chamber 7 or even against the transverse face 1 of the cylinder head. The configuration of the combustion chamber 7 at the junction of the axially extending wall and of the transverse face 1 will determine whether the axis of the jet III is to be directed in a radial plane against an axially extending wall or is to be slanted toward the transverse face 1.

The angle of inclination of the injection valve 6 is determined by the dimensions of the combustion chamber 7. It may also be influenced by the requirement to arrange the nozzle orifices of the injection valve 6 symmetrically.

Figure 3:
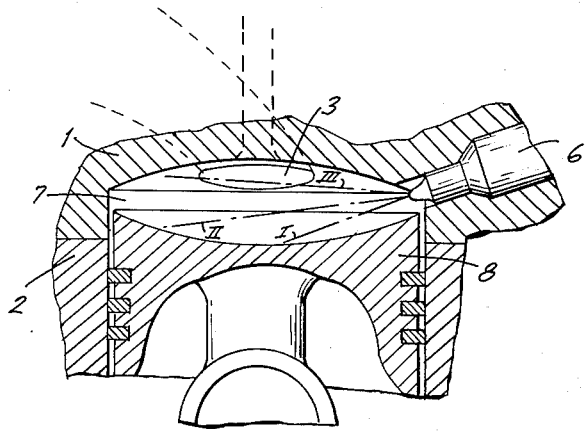
FIG. 3 illustrates the top portion of another cylinder equipped with the fuel jet arrangement of the invention, the cylinder being shown in axial section.

FIG. 3 shows a lens-shaped combustion chamber 7 in longitudinal section. The principles of arrangement of fuel jets I, II, III are not changed from those illustrated in FIGS. 1 and 2. The lens-shaped combustion chamber enables use of still larger valves than a disk-shaped space. Identical reference numerals relate to identical or corresponding elements in all the figures.

Figure 4:
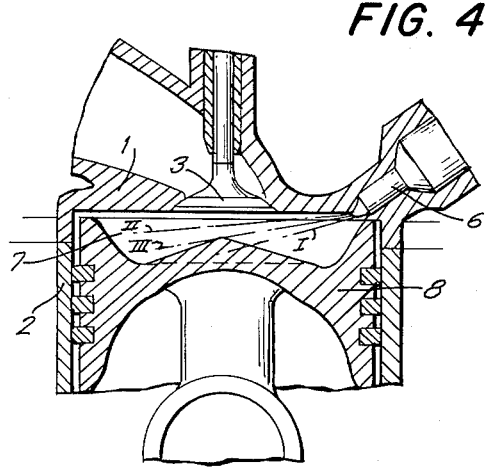
FIG. 4 shows a modification of the device of FIG. 3.

FIG. 4 shows as application of the present invention to a Hesselmann type combustion space in which the three orifices of nozzle 6 can not be disposed in one plane symmetrically to the axis of nozzle 6. A fan-shaped fuel jet cannot, therefore, be substituted in this type of combustion chambers for a plurality of individual fuel jets.

Within the scope of the present invention the ignition jets can be arranged in several different ways, in such a manner that either all the jets, including the igniting one, are discharged in the direction of the rotational air movement, or the ignition jet is perpendicular to the direction of rotating air, or it is directed against this movement whereas the remaining jets are always discharged in the direction of air rotation.

As already mentioned, within the scope of the invention a similar effect can essentially be attained by using instead of a plurality of jets a single fan-like jet which is arranged so that one lateral edge of the fan of fuel particles is aimed towards the transverse face of the piston and the remaining portions of the fan are aimed progressively further towards the circumference of the combustion chamber. The embodiments illustrated relate to application of the present invention to four-stroke engines, but the invention can also be successfully applied in a similar manner to two-stroke engines if rotating air movement within the cylinder is provided for.

What I claim is:

1. In an internal combustion engine, in combination, a cylinder having an axis; a piston axially movable in said cylinder, said cylinder and said piston forming the wall of a combustion space, the temperature of said wall during operation of said engine increasing non-uniformly and the temperature of a portion of said wall being highest; means for admitting air to said combustion space and for causing said admitted air to flow about said axis in a rotary path in one direction; and fuel nozzle means on said cylinder for injecting a plurality of fuel portions simultaneously into said combustion space, one of said fuel portions being injected toward said wall portion of highest temperature to reach the same directly and to be ignited thereby, and the remainder of said fuel portions being injected into said path substantially in the direction of movement of said air for delayed ignition.

2. In an internal combustion engine of the compression ignition type, in combination, a cylinder having an axis; a piston axially movable in said cylinder, said cylinder and said piston forming the wall of a combustion space about said axis, the temperature of said wall during operation of said engine increasing non-uniformly and the temperature of a portion of said wall adjacent said axis being highest; means for admitting air to said combustion space and for causing said admitted air to flow in a rotary path centered substantially on said axis in one direction; and fuel nozzle means on said cylinder and spaced from said axis for injecting a plurality of fuel portions simultaneously into said combustion space, one of said fuel portions being injected toward said wall portion adjacent said axis to reach the same directly and to be ignited thereby, and the remainder of said fuel portions being injected into said path substantially in the direction of movement of said air for delayed ignition.

3. In an internal combustion engine, in combination, a cylinder having an axis; a piston axially movable in said cylinder, said cylinder and said piston forming the wall of a combustion space; means for admitting air to said combustion space and for causing said admitted air to flow about said axis in a rotary path in one direction; and fuel nozzle means on said cylinder for injecting a plurality of fuel portions simultaneously into said combustion space, one of said fuel portions being injected toward a portion of said wall adjacent said axis in a direction transverse of the rotary path of said air, and the remainder of said fuel portions being injected into said path substantially in the direction of movement of said air.

4. In an internal combustion engine, in combination, a cylinder having an axis; a piston axially movable in said cylinder, said cylinder and said piston forming the wall of a combustion space; means for admitting air to said combustion space and for causing said admitted air to flow in a rotary path centered substantially on said axis in one direction; and fuel nozzle means mounted on said cylinder and spaced from the axis thereof for injecting a plurality of fuel portions simultaneously into said combustion space, one of said fuel portions being injected toward a portion of said wall adjacent said axis in a direction transverse of the rotary path of said air, and the remainder of said fuel portions being injected into said path substantially in the direction of movement of said air.

5. In an internal combustion engine, in combination, a cylinder having an axial cavity, a radial face and an axially extending cylindrical face in said cavity; a piston axially movable in said cavity and having a radial face therein, said faces of said cylinder and of said piston forming the wall of a combustion space, said radial faces extending from said cylindrical face continuously toward the axis of said cylinder; means for admitting air to said combustion space and for causing said admitted air to flow about said axis in a rotary path in one direction; and fuel nozzle means on said cylinder for injecting a plurality of liquid fuel portions simultaneously into said combustion space, one of said fuel portions being injected toward a portion of said wall portion adjacent said axis, and the remainder of said fuel portions being injected into said path substantially in the direction of movement of said air.

6. In an internal combustion engine, in combination, a cylinder having an axis; a piston axially movable in said cylinder, said cylinder and said piston forming the wall of a combustion space, the temperature of said wall during operation of said engine increasing non-uniformly the temperature of a portion of said wall adjacent the axis of said cylinder being highest; means for admitting air to said combustion space and for causing said admitted air to flow in a rotary path substantially centered on said axis in one direction; and fuel nozzle means mounted on said cylinder and spaced from the axis thereof for injecting a plurality of fuel portions simultaneously into said combustion space, one of said fuel portions being injected substantially radially inward toward said wall portion at highest temperature to reach the same direction and to be ignited thereby, and the remainder of said fuel portions being injected into said path substantially in the direction of movement of said air for delayed ignition.

7. In an internal combustion engine, in combination, a cylinder having an axis; a piston axially movable in said cylinder, said cylinder and said piston forming the wall of a combustion space, the temperature of said wall during operation of said engine increasing non-uniformly and the temperature of a portion of said wall adjacent the axis of said cylinder being highest; means for admitting air to said combustion space and for causing said admitted air to flow about said axis in a rotary path in one direction; and fuel nozzle means mounted on said cylinder and spaced from the axis thereof for injecting a plurality of fuel portions simultaneously into said combustion space, one of said fuel portions being injected substantially radially toward said wall portion at highest temperature to reach the same directly and to be ignited thereby, and the remainder of said fuel portions being injected tangentially into said path in the direction of movement of said air for delayed ignition.

8. In an internal combustion engine, in combination, a cylinder having an axis; a piston axially movable in said cylinder, said cylinder and said piston forming the wall of a combustion space, the temperature of said wall during operation of said engine increasing non-uniformly and the temperature of a portion of said wall being highest; means for admitting air to said combustion space and for causing said admitted air to flow in a rotary path centered substantially on said axis in one direction; and fuel nozzle means on said cylinder for injecting a plurality of fuel portions simultaneously into said combustion space in a fan pattern, one of said fuel portions forming an outer edge of said fan pattern being injected toward said wall portion at highest temperature to reach the same directly and to be ignited thereby, and the remainder of said fuel portions being injected into said path substantially in the direction of movement of said air for delayed ignition.

9. In an internal combustion engine, in combination, a cylinder having an axis; a piston axially movable in said cylinder, said cylinder and said piston forming the wall of a combustion space, the temperature of said wall during operation of said engine increasing non-uniformly and the temperature of a portion of said wall being highest; means for admitting air to said combustion space and for causing said admitted air to flow about said axis in a rotary path in one direction; and fuel nozzle means on said cylinder for injecting a plurality of fuel portions simultaneously into said combustion space substantially in a common plane, one of said fuel portions being injected toward said wall portion at highest temperature to reach the same directly and to be ignited thereby, and the remainder of said fuel portions being injected into said path substantially in the direction of movement of said air for delayed ignition.

10. In an internal combustion engine of the compression ignition type, in combination, a cylinder having an axis; a piston axially movable in said cylinder, said cylinder and said piston forming the wall of a space for open combustion; means for admitting air to said combustion space and for causing said admitted air to flow in a rotary path substantially centered on said axis in one direction; and fuel nozzle means mounted on said cylinder and spaced from the axis thereof for injecting a plurality of liquid fuel portions simultaneously into said combustion space, one of said fuel portions being injected substantially radially toward a said wall portion adjacent said axis, and the remainder of said fuel portions being injected tangentially into said path in the direction of movement of said air.

References Cited in the file of this patent
UNITED STATES PATENTS

| | | |
|---|---|---|
| 2,858,810 | Hoffman | Nov. 4, 1958 |
| 2,868,181 | Dolza | Jan. 13, 1959 |